United States Patent
Cone, II et al.

(10) Patent No.: US 6,286,844 B1
(45) Date of Patent: Sep. 11, 2001

(54) STROLLER WITH REMOVABLE SEAT

(75) Inventors: Richard E. Cone, II, Athens, OH (US); Richard Glover, Greenwood; Dennis M. Turner, Mooresville, both of IN (US)

(73) Assignee: Cosco Management, Inc., Wilmington, DE (US)

( * ) Notice: Subject to any disclaimer, the term of this patent is extended or adjusted under 35 U.S.C. 154(b) by 0 days.

(21) Appl. No.: 09/103,886

(22) Filed: Jun. 24, 1998

Related U.S. Application Data

(60) Provisional application No. 60/050,702, filed on Jun. 24, 1997.

(51) Int. Cl.$^7$ ................................. B62B 7/08; B62B 1/00
(52) U.S. Cl. ...................... 280/47.41; 280/643; 280/658; 280/650
(58) Field of Search ............................. 280/30, 643, 650, 280/647, 658, 304.5, 642, 47.41; 297/130, 256.16, 440.16

(56) References Cited

U.S. PATENT DOCUMENTS

| | | |
|---|---|---|
| 1,727,335 | 9/1929 | Chatfield . |
| 2,435,733 | 2/1948 | Belyeu . |
| 2,508,905 | 5/1950 | Cohen . |
| 2,509,103 | 5/1950 | Lewis et al. . |
| 2,574,743 | 11/1951 | King . |
| 2,722,966 | 11/1955 | Belyeu . |
| 2,805,076 | 9/1957 | Thomas . |
| 2,864,429 | 12/1958 | Combs . |
| 3,083,997 | 4/1963 | Chreist, Jr. . |
| 3,116,069 | 12/1963 | Dostal . |
| 3,549,164 | 12/1970 | Raynor . |
| 3,829,113 | 8/1974 | Epelbaum . |
| 4,108,468 | 8/1978 | Orlanski . |
| 4,412,689 | 11/1983 | Lee . |
| 4,537,414 | 8/1985 | Nusbaum . |
| 4,570,956 | 2/1986 | Dyer . |
| 4,697,845 | * 10/1987 | Kamman ............................. 297/118 |
| 4,743,063 | 5/1988 | Foster, Jr. . |
| 4,750,783 | 6/1988 | Irby et al. . |
| 4,762,331 | 8/1988 | Tucker et al. . |
| 4,768,795 | 9/1988 | Mar . |
| 4,786,064 | 11/1988 | Baghdasarian . |
| 4,822,064 | 4/1989 | Hunter . |
| 4,832,354 | 5/1989 | LaFreniere . |
| 4,834,403 | 5/1989 | Yanus et al. . |
| 4,861,105 | * 8/1989 | Merten et al. ....................... 297/130 |
| 4,874,182 | 10/1989 | Clark . |
| 4,915,401 | 4/1990 | Severson et al. . |
| 4,921,261 | 5/1990 | Sadler, Jr. et al. . |
| 5,121,940 | 6/1992 | March . |
| 5,133,567 | 7/1992 | Owens . |
| 5,197,753 | 3/1993 | Liu . |
| 5,201,535 | 4/1993 | Kato et al. . |
| 5,203,577 | 4/1993 | Kato et al. . |
| 5,234,224 | 8/1993 | Kim . |
| 5,265,931 | 11/1993 | Ryan . |
| 5,364,137 | 11/1994 | Shimer . |
| 5,375,869 | 12/1994 | Hsiao . |
| 5,385,386 | 1/1995 | Beamish et al. . |
| 5,499,831 | 3/1996 | Worth et al. . |

(List continued on next page.)

OTHER PUBLICATIONS

Maxi–Cosi Collection/coleccion/collectie '97, Maxi–Taxi Plus, Maxi–Miliaan bv (1997).
Maxi–Cosi Colour Sheet, p. 3, (1994).

Primary Examiner—Lanna Mai
Assistant Examiner—Hau Phan
(74) Attorney, Agent, or Firm—Barnes & Thornburg

(57) ABSTRACT

A stroller includes a frame, a stroller seat coupled to the frame, and a pair of romovable carrier-support adapters positioned and mounted to support a romovable infant carrier on the frame and above the stroller seat.

40 Claims, 6 Drawing Sheets

U.S. PATENT DOCUMENTS

| | | |
|---|---|---|
| 5,527,096 | 6/1996 | Shimer . |
| 5,564,778 | 10/1996 | Shimer et al. . |
| 5,567,008 | 10/1996 | Cone, II . |
| 5,601,297 | 2/1997 | Stein . |
| 5,676,386 | 10/1997 | Huang . |
| 5,707,106 | 1/1998 | Clark . |
| 5,727,798 | 3/1998 | Walters et al. . |
| 5,772,279 | 6/1998 | Johnson, Jr. . |
| 5,865,447 * | 2/1999 | Huang ................................. 280/30 |
| 5,876,046 * | 3/1999 | Courtney et al. .................. 280/30 |
| 5,974,555 * | 9/1999 | Welsh, Jr. et al. ................ 280/30 |

* cited by examiner

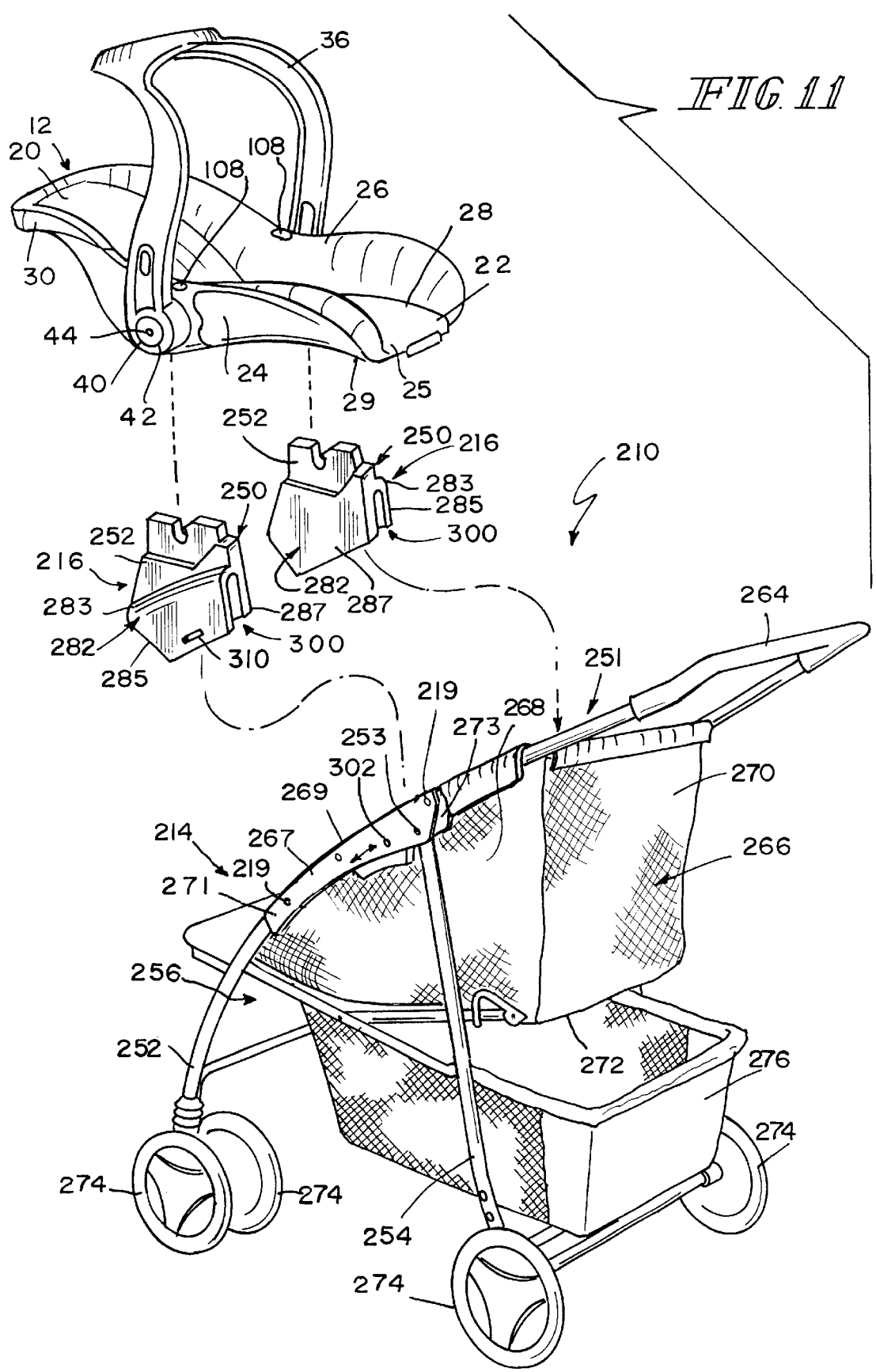

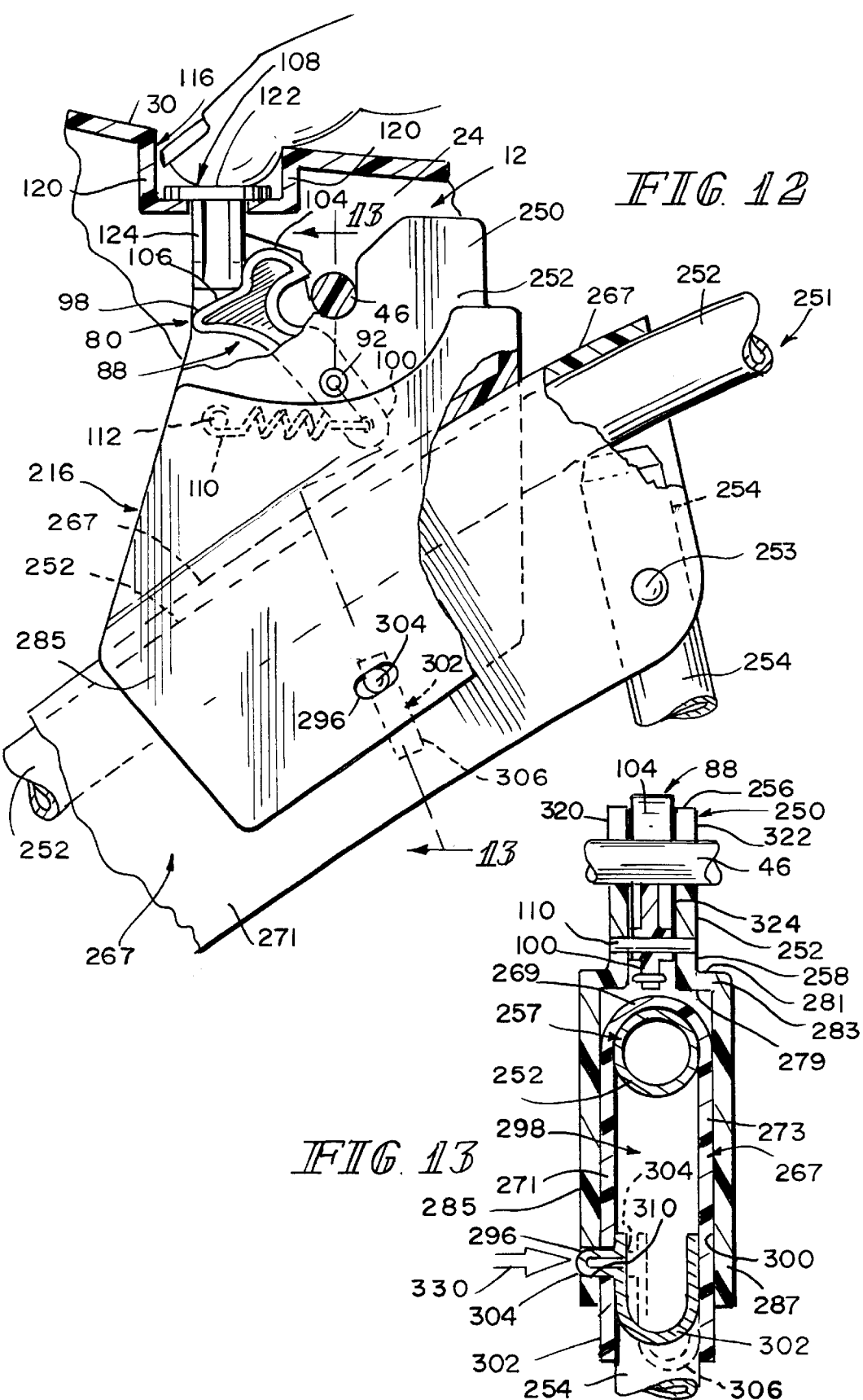

STROLLER WITH REMOVABLE SEAT

This claims priority under 35 U.S.C. §119(e) of Ser. No. 60/050,702 filed Jun. 24,1997.

BACKGROUND AND SUMMARY OF THE INVENTION

The present invention relates to a juvenile stroller, and particularly to a stroller configured to receive a removable infant carrier. More particularly, the present invention relates to a apparatus including removable carrier-support adapters mounted on the stroller to support an infant carrier therebetween.

According to the present invention, a stroller includes a frame, a stroller seat coupled to the frame, and a pair of removable carrier-support adapters positioned and mounted to support a removable infant carrier on the frame and above the stroller seat.

In preferred embodiments, the carrier-support adapters are snapped onto the frame to enable a user to mount an infant carrier on the frame above the stroller seat. In one embodiment, the stroller seat is mounted for controlled movement relative to the frame and, in another embodiment, the stroller seat is fixed to the frame.

The infant carrier is adapted to be mounted, for example, on the stroller frame or on a base anchored to a seat in a vehicle. The carrier-support adapters are configured to enable a child to be seated in the stroller seat while the carrier-support adapters remain mounted on the frame. The carrier-support adapters can be removed from the frame easily by a user when they are not needed to support an infant carrier above the stroller seat.

In one embodiment, each carrier-support adapter is configured to be coupled to, and removable from, the frame. In another embodiment, each carrier-support adapter is configured to be coupled to, and removable from the stroller seat.

Also in preferred embodiments, the stroller includes a canopy that is adapted to be mounted to the frame to cover the stroller seat. The canopy is also adapted to be mounted to the carrier-support adapters to cover an infant carrier mounted on the carrier-support adapters to lie above the stroller seat.

Additional features and advantages of the invention will become apparent to those skilled in the art upon consideration of the following detailed description of the preferred embodiment exemplifying the best mode of carrying out the invention as presently perceived.

BRIEF DESCRIPTION OF THE DRAWINGS

The detailed description particularly refers to the accompanying figures in which:

FIG. 11 is an exploded perspective view of an apparatus in accordance with the present invention showing a stroller including a frame and a stroller seat coupled to the frame and showing a detachable carrier-support adapter configured to be coupled to the frame and an infant carrier configured to be coupled to the support adaptors;

FIG. 12 is an enlarged side view with portions broken away of one support adapter mounted upon the stroller and supporting an infant carrier showing the stroller including a frame member and a saddle extending over the frame member and the carrier-support adapter including a stroller mount coupled to the saddle and a carrier mount including a clamp assembly being pivoted by a release button of the infant carrier to a mounting post-receiving open position; and FIG. 13 is a view taken along lines 13—13 of FIG. 12 showing the saddle defining a central cavity that houses a flexible pivot pin therein and showing the stroller mount of the carrier-support adapter including an aperture receiving the pivot pin therethrough to couple the carrier-support adapter on the stroller.

DETAILED DESCRIPTION OF THE DRAWINGS

Figure 1:
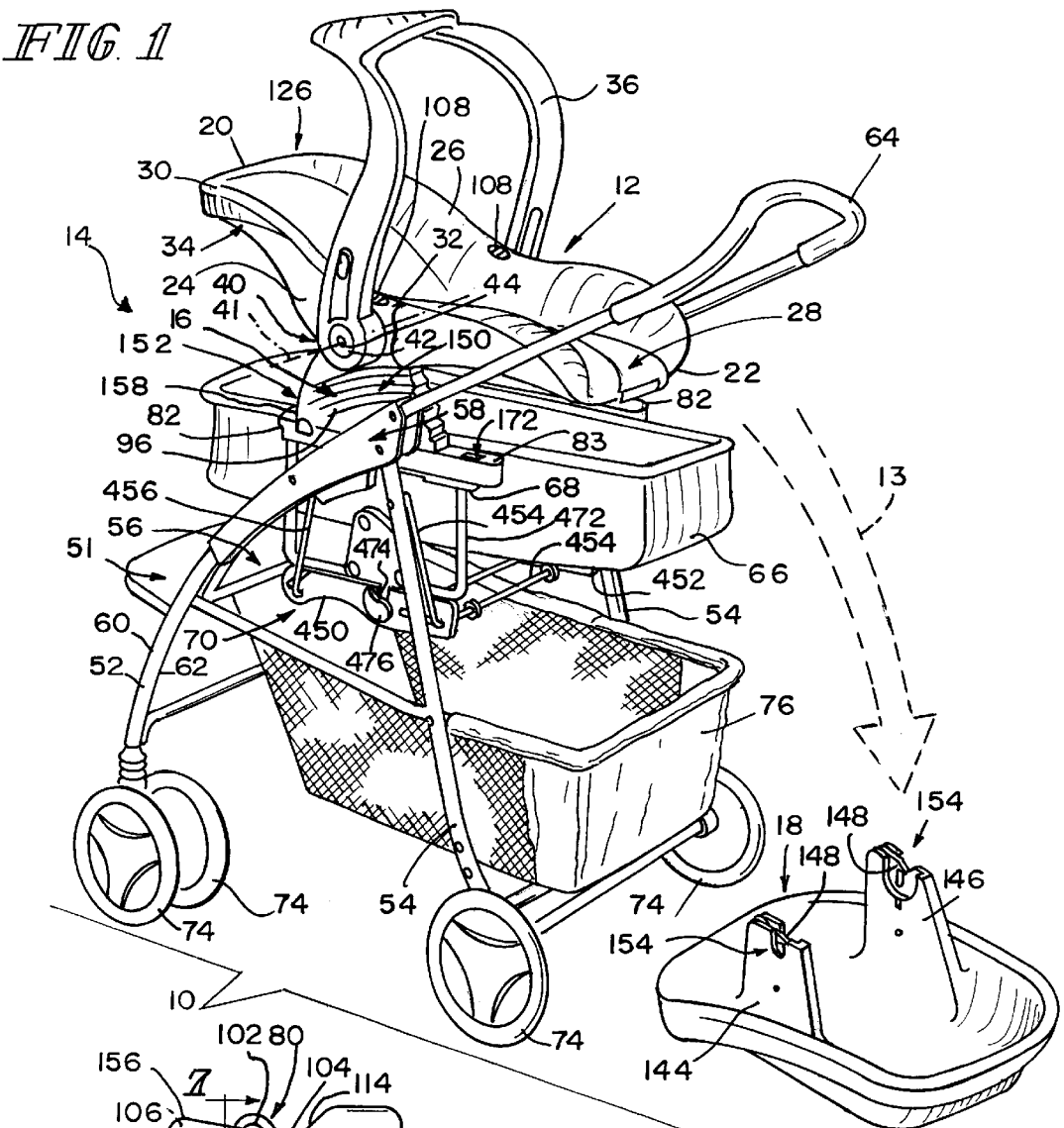
FIG. 1 is a perspective view of an apparatus in accordance with the present invention showing a stroller including a frame and a stroller seat having a side rail, a detachable carrier-support adapter coupled to the side rail, an infant carrier coupled to the support adaptor, and a base separated from the stroller and formed to be fastened within a vehicle.

As shown in FIG. 1, apparatus 10 is provided that enables a caregiver (not shown) to transport, as shown by arrow 13, an infant (not shown) in an infant carrier 12 from a stroller 14 to a base 18 mounted in a car (not shown) without disruption. In addition, apparatus 10 enables the caregiver to remove infant carrier 12 from stroller 14 and immediately place the infant or another child into the stroller 14. Thus, the caregiver may quickly and easily convert stroller 14 from infant to toddler use, by simply removing infant carrier 12 from stroller 14.

Apparatus 10 includes stroller 14 that includes a set of detachable carrier-support adapters 16 configured to couple infant carrier 12 on stroller 14. Carrier-support adapters 16 enable the caregiver to place the infant in a stroller seat 66 without removing carrier-support adapters 16. When infant carrier 12 is mounted on stroller 14, infant carrier 12 is positioned so that the infant faces the caregiver enabling interaction with the infant. Additionally, infant carrier 12 is removable from stroller 14 and base 18 so that infant carrier 12 can also be used alone to transport an infant or child (not shown) to a wide variety of locations. Referring to FIG. 1, apparatus 10 also includes base 18 separated from stroller 14 and formed to receive selectively infant carrier 12. Infant carrier 12 may be mounted either to carrier-support adapters 16 or to base 18 depending upon the desired location of the infant.

Figure 8:
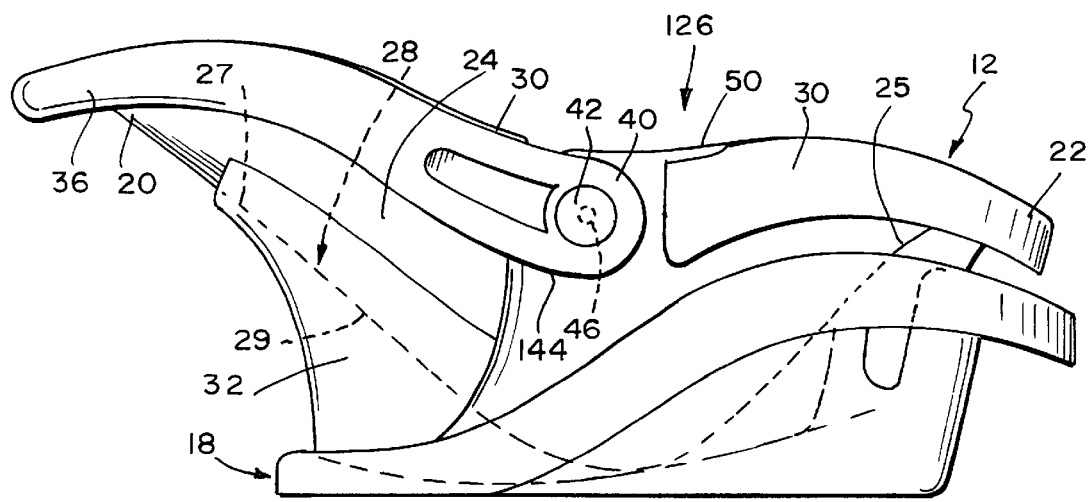
FIG. 8 is a side elevation view of the infant carrier of FIG. 1 showing the infant carrier fully installed in the base and showing (in phantom) a curved floor inside the infant carrier, an external bottom wall on infant carrier, and an infant carrier-receiving floor positioned to lie within the base.

As shown in FIG. 1, for example, infant carrier 12 may be mounted on carrier-support adapters 16 while the infant is traveling in stroller 14. In addition, as shown in FIG. 8, infant carrier 12 can be mounted selectively on base 18 while the infant is traveling on in an automobile (not shown). The infant carrier 12 can also be mounted directly on an automobile seat or the like while the infant is traveling in the automobile to permit travel in a vehicle with the infant when base 18 is not conveniently accessible. When infant carrier 12 is mounted directly to an automobile seat (not shown), carrier 12 is positioned so that the infant faces rearwardly when held in carrier 12.

As shown in FIG. 1, infant carrier 12 is coupled selectively to carrier-support adapters 16. A wide variety of infant carrier-s are suitable for use with the present invention including the infant carrier described in detail in U.S. Pat. No. 5,567,008 entitled "Portable Infant Seat Having A Detachable Base", to Cone, II, the specification of which is incorporated herein by reference. Infant carrier 12 includes a head end 20, a foot end 22, and two longitudinally extending side walls 24, 26 extending between head and foot ends 20, 22. Additionally, infant carrier 12 includes a continuous lip 30 extending about head end 20, foot end 22, and side walls 24, 26 of infant carrier 12. Lip 30 is formed to define a downwardly facing U-shaped channel 34 about infant carrier 12. In addition, infant carrier 12 includes an infant seat 28 sized and shaped to receive the infant therein. As shown in FIG. 8, infant seat 28 has a floor 25 with a top side 27 and a bottom side 29. Infant carrier 12 is also formed to include a shell 32 coupled to floor 25.

A pivotable U-shaped handle 36 is coupled to side walls 24, 26 of infant carrier 12 to facilitate transport of portable infant carrier 12. Handle 36 is coupled to side walls 24, 26 by two rotatable hubs 40, one of which is shown in FIG. 1. It is understood that while only hub 40 that is positioned to lie adjacent to side wall 24 will be illustrated and described, hub 40 adjacent to side wall 26 is formed in a similar manner. Hub 40 is mounted to side wall 24 of infant carrier 12 approximately half-way between head end 20 and foot end 22. Hub 40 includes a hub cover 42 that is appended integrally to the terminal end of handle 36. Hub cover 42 is mounted for rotation relative to side wall 24 by a connector 44 that is coincident with the axis of rotation 41 of hub 40. While connector 44 is illustratively a rivet, a wide variety of connectors such as pins, screws, rods, and the like may be used in accordance with the present invention.

Figure 4:
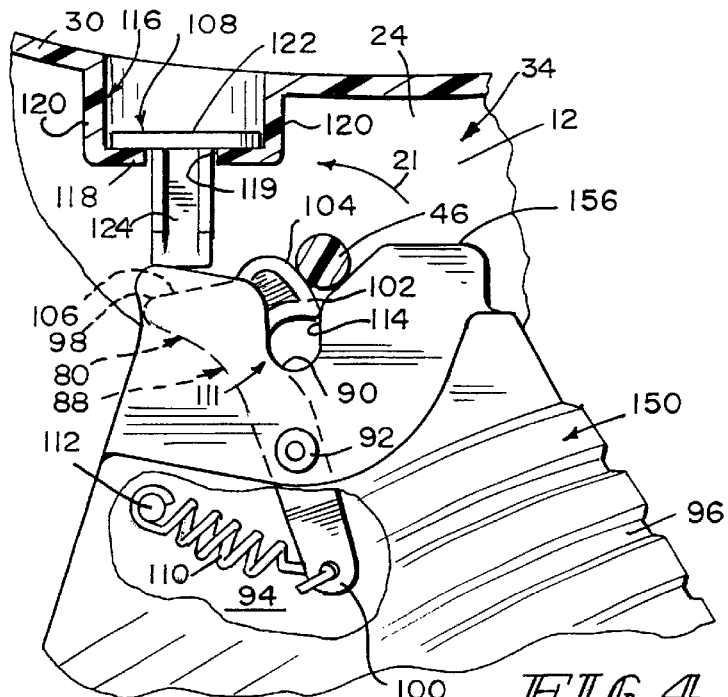
FIG. 4 is side view of a portion of the infant carrier and the support adaptor of FIG. 1 showing the infant carrier including a mounting post contacting an upwardly facing first cam surface provided on the pivotable clamp arm to pivot the clamp arm against its biasing spring toward a slot-opening position as the infant carrier is lowered into engagement with the underlying carrier-support adaptor.
Figure 5:
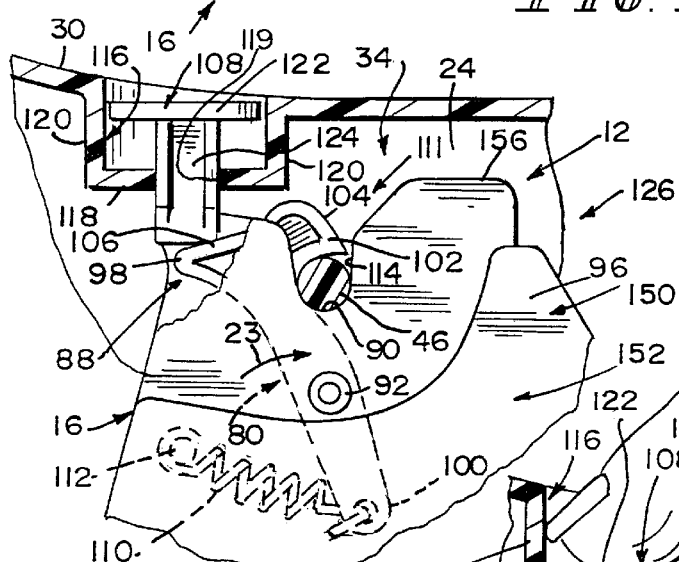
FIG. 5 is a view similar to FIG. 4 of the infant carrier in an installed position in the carrier-support adaptor showing the infant carrier including a release button positioned to engage selectively a second camming surface on the clamp arm and showing the mounting post seated in a U-shaped mounting slot of the body portion and the clamp arm positioned to lie in a closed position.
Figure 6:
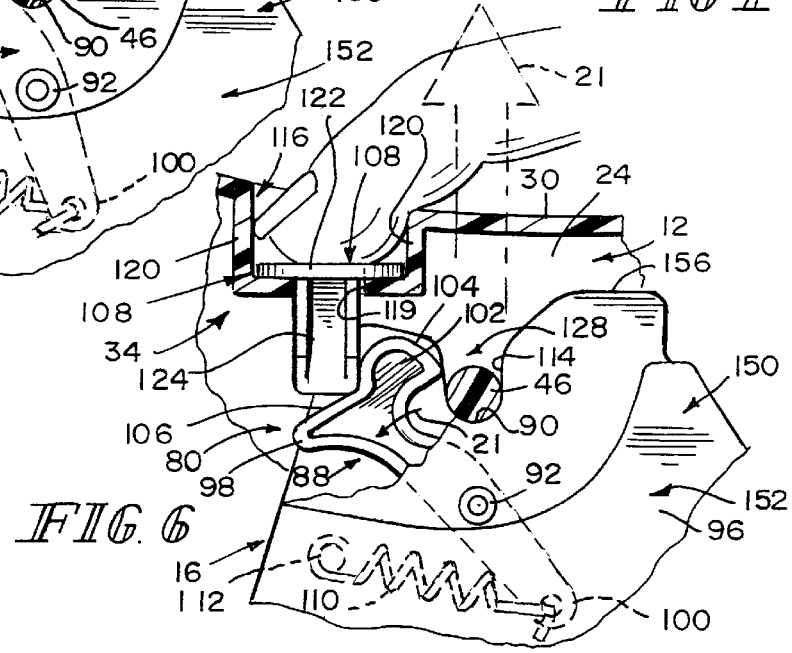
FIG. 6 is a view similar to FIGS. 4 and 5 showing the position of the release button after having been depressed manually by a caregiver and moved to a mounting post-releasing position to pivot the clamp arm against the biasing spring to a mounting post-receiving open position allowing a user to lift the mounting post out of the U-shaped mounting slot without interference from the clamp arm during removal of the infant carrier from the carrier-support adaptor.

As shown in FIGS. 4–6, a mounting post 46 is located inside of channel 34 and adjacent to side wall 24. Mounting post 46 provides support to maintain the spaced-apart relation of side wall 24 and lip 30. While mounting post 46 is illustratively cylindrical in shape, mounting post 46 may take on a wide variety of shapes and sizes in accordance with the present invention. Hub 40 freely rotates from a position in which handle 36 is approximately flush with head end 20 of carrier 12 as shown in FIG. 8 to a position as shown in FIG. 1. While hub 40 is illustrated and described for supporting handle 36, a wide variety of hubs and various attachment mechanisms may be used in accordance with the present invention.

Referring now to FIG. 1, infant seat 12 further includes spring-loaded release buttons 108 that permit the caregiver to remove infant carrier 12 from carrier-support adapters 16. As shown in FIGS. 4–6, each release button 108 is positioned to lie in a depression 116 formed in lip 30. Each depression 116 is positioned to lie near hub 40 and toward head end 20 of infant carrier 12. Each depression 116 is defined by a bottom wall 118 having an aperture 119 therethrough and a rim 120 extending between lip 30 and bottom wall 118. Release buttons 108 include a top wall 122 sized to fit inside of depression 116 and opposite bottom tab 124 extending from top wall 122 through aperture 119. Compression springs (not shown) yieldably urge release buttons 108 away from bottom wall 118 so that top wall 122 of release buttons 108 normally lie essentially flush with lip 30 of infant carrier 12.

Lip 30 of infant carrier 12, as shown in FIG. 8, is further formed to further include a slot 50. Slot 50 is sized to receive a conventional vehicle seat belt (not shown) so that infant carrier 12 can be mounted directly to a vehicle seat (not shown), independent of base 18. Seat belt (not shown)is passed through slot 50 and across the top of infant carrier 12 when infant carrier 12 is mounted directly to vehicle seat (not shown) without using base 18. Infant carrier 12 is configured to face rearwardly when infant carrier 12 is mounted directly to vehicle seat (not shown). A harness (not shown) is provided to restrain an infant seated in infant carrier 12.

Infant carrier 12 is formed to be mounted selectively on stroller 14 by carrier-support adapters 16. As shown in FIG.

1, stroller 14 includes a frame 51. Frame 51 includes a front frame member 52 and a rear frame member 54 coupled to first frame member 52 to form a seat-receiving cavity 56 therebetween. Front and rear frame members 52, 54 are joined along a pivot axis 58 by a frame connector (not shown) that extends from an exterior side 60 of stroller 14 to an interior side 62. A handle 64 is also coupled to front frame member 52.

Further, stroller 14 includes a stroller seat 66 that is positioned to lie in seat-receiving cavity 56 and is coupled to frame 51 by a swing unit 70. Stroller seat 66 includes a side rail 68 and swing unit 70 connects frame member 52 and side rail 68. Swing unit 70 permits stroller seat 66 to move relative to frame 51 in a swinging type motion, such as a "rocking" motion or "gliding motion".

Swing unit 70 includes first and second seat-coupling bars 450, 452, a fore U-shaped swing arm 454 connected and arranged to extend between frame 51 and seat-coupling bars 450, 452, and a rear U-shaped swing arm 456 spaced apart from fore U-shaped swing arm 454 and connected and arranged to extend between frame 51 and seat-coupling bars 450, 452 as shown in FIG. 1.

Figure 10:
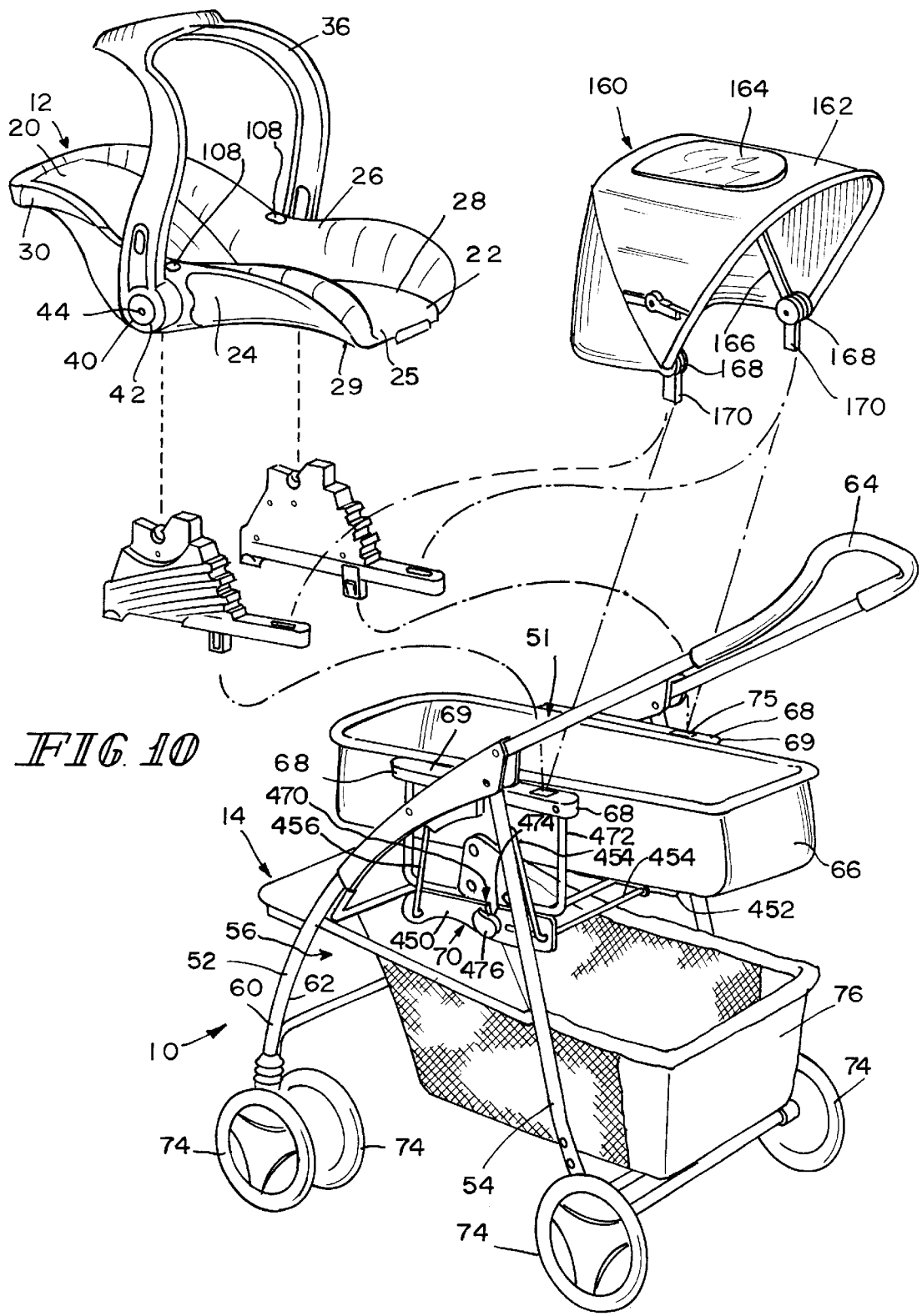
FIG. 10 is an exploded assembly view of the apparatus of the present invention showing the stroller having two side rails that each include an aperture therethrough, two carrier-support adapters that each include a carrier mount having a body portion housing a clamping assembly, a stroller mount having a locking mechanism sized for extension through the aperture in the side rail and a platform with a hole therethrough, the infant carrier being formed to fasten to the clamping assembly, and a canopy having a fabric cover and spaced apart posts coupled to the fabric cover and sized for selective extension into both the slots formed in the side rails of the stroller and the holes formed in the carrier-support adapter to mount the canopy on the stroller.

Seat member 72 is connected to seat-coupling bars 450, 452 as shown in FIG. 1. Seat member 72 includes a seat frame 472 extending between side rail 68 and seat-coupling bars 450, 452. Referring now to FIG. 10, seat frame 472 includes an attachment pin 462 arranged to face toward first seat-coupling bar 550 and a second attachment pin (not shown) arranged to face toward second seat-coupling bar 552. Each of first and second seat-coupling bars 450, 452 is formed to include a seat attachment pin-receiving slots 470 having an open end 474 configured to receive seat attachment pin 462 as shown in FIG. 10. A seat locking device 476 is connected to each of seat-coupling bars 450, 452 and configured to close open end 474 of first seat attachment pin-receiving slot 470 to trap seat attachment pin 462 and second seat attachment pin (not shown) in seat-coupling bars 450, 452 respectively. While swing unit 70 is illustrated and described, it is understood that a wide variety of swing assemblies may be included in apparatus 10 of the present invention.

Figure 3:
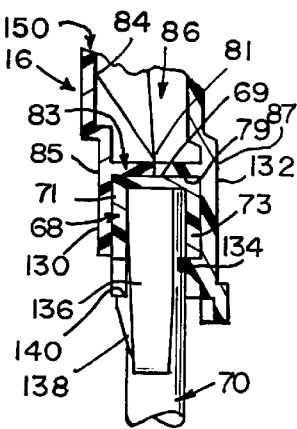
FIG. 3 is a cross sectional view taken along lines 3—3 of FIG. 2 showing the stroller mount of the carrier-support adaptor including a platform resting on the side rail, two arms straddling the side rail, one of the arms including a tab engaging the side rail, and a second locking mechanism extending from the platform between the two arms, the second locking mechanism including a flexible locking tab thereon.

As shown in FIG. 3, side rail 68 of stroller seat 66 includes top surface 69 and side walls 71, 73 depending from top surface 69. Referring now to FIG. 10, top surface 69 is formed to include an aperture 75 therethrough. In preferred embodiments, wheels 74 are coupled to front and rear frame members 52, 54 of frame 51 and a basket 76 is positioned to lie in seat-receiving cavity 56 between wheels 74 and stroller seat 66.

Referring now to FIG. 10, stroller 14 further includes a collapsible canopy 160. Canopy 160 has a fabric portion 162 with a fabric covered window portion 164, a frame 166 that supports fabric portion 162, hubs 168 coupled to frame 166, and mounting posts 170 that are spaced apart from one another and coupled to hub 168 to permit pivoting movement of fabric portion 162 relative to mounting posts 170. See FIG. 10. Canopy 160 is coupled directly to stroller seat 66 by extending each mounting post 170 through respective aperture 75 in side rail 68 when carrier-support adaptors 16 are removed from side rails 68. As will be discussed hereafter, canopy 160 may also be mounted on support adaptors 16.

As shown in FIG. 1, stroller 14 also includes carrier-support adapters 16 that are configured to cooperate with stroller seat 66 to define a cavity 17 sized to receive infant carrier 12 therein. Illustratively, carrier-support adapters 16 enable the caregiver to attach infant carrier 12 onto stroller 14 without having to remove the infant from infant carrier 12; to remove infant carrier 12 from stroller 14 without having to remove the infant from infant carrier 12; and to place the infant or another child in stroller seat 66 without first removing carrier-support adapters 16. Later, carrier-support adapters 16 can be removed from side rail 68 when infant seat 12 is no longer needed.

Figure 2:
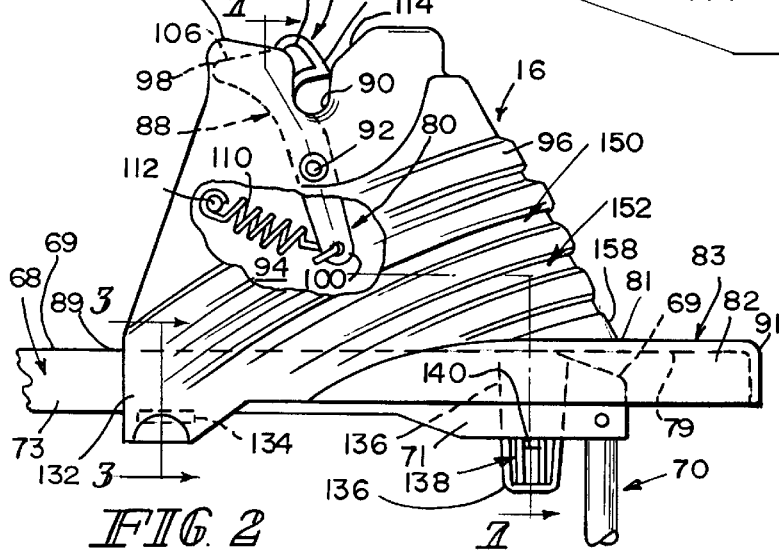
FIG. 2 is a side elevation view, with portions broken away, of one carrier-support adaptor of FIG. 1 showing the carrier-support adapter including a stroller mount coupled to the side rail of the stroller seat and a carrier mount having a body portion housing in part a clamping assembly that includes a pivotable clamp arm and a biasing spring coupled to the clamp arm.

Carrier-support adapters 16 are mounted selectively upon side rail 68 and are arranged to support infant carrier 12. Each carrier-support adapter 16 includes a stroller mount or rail-receiving base 82. Stroller mount 82 is mounted upon side rail 68 and includes a platform 83. Platform 83 is configured to rest upon top surface 69 of side rail 68. As shown in FIGS. 2 and 3, platform 83 includes a bottom side 79 configured to engage top surface 69 of rail 68, and opposite top side 81, side walls 85, 87, and opposite ends 89, 91. Arms 130, 132 are positioned to lie at one end 89 of stroller mount 82 and to extend from opposite edges of platform 83. Arms 130, 132 may be positioned to lie in a variety of positions on platform 83 in accordance with the present invention.

As shown in FIG. 3, arms 130, 132 are configured to straddle side walls 71, 73 of side rail 68. One arm 132 includes a flexible tab portion 134 that engages selectively side wall 73 of side rail 68. In addition, as shown in FIGS. 2 and 3, stroller mount 82 includes a second locking mechanism 136 that is sized for extension through aperture 75 in side rail 68 and for selective engagement with side wall 71. Referring now to FIG. 10, second locking mechanism 136 includes a flexible tab 138 that includes a foot portion 140 thereon. Foot portion 140 selectively engages wall 71, as shown in FIG. 3. While arms 130, 132 and second locking mechanism 136 are illustrated and described, a wide variety of selectively detachable fastener mechanisms such as latches, buttons, snaps, and the like may be used in accordance with the present invention to couple selectively carrier-support adapter 16 to side rail 68.

Carrier-support adapters 16 are also formed to include a carrier mount 150 extending from stroller mount 82 to couple selectively infant carrier 12 thereto. Carrier mount 150 includes a body portion 152 that cooperates with stroller seat 66 to define cavity 17. Body portion 152 also houses a clamping assembly 80 therein. Clamping assembly 80 is configured to grip one of mounting posts 46 attached to infant carrier 12. A support member 16 and clamping assembly 80 is illustrated in FIGS. 2–7. Although there are two clamping assemblies 80 and two mounting posts 46, FIGS. 3–7 will be used in connection with the description below of one of those sets of mounting posts 46 and clamping assemblies 80. This description, however, applies to both mounting posts 46 and clamping assemblies 80

Figure 7:
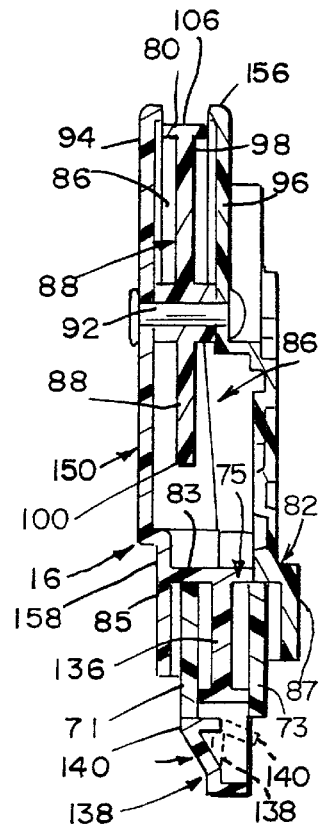
FIG. 7 is a cross sectional view taken along lines 7—7 of FIG. 2 showing the clamp arm mounted in the body portion of the carrier mount by a pivot member and showing the flexible locking tab of the second locking mechanism engaging the side rail.

Each body portion 152 of carrier-support adapter 16 that houses clamping assembly 80 includes a top end 156, an opposite bottom end 158 adjacent to stroller mount 82, and side panels 94, 96. Side panels 94, 96 extend between top and bottom ends 156, 158 and define a hollow interior cavity 86 as shown in FIGS. 3 and 7. Clamping assembly 80 includes an elongated clamp arm 88 mounted inside hollow interior cavity 86 of body portion 152. As shown in FIG. 5, clamp arm 88 extends across the width of interior cavity 86 adjacent to a mounting post-receiving slot 90 formed in top end 156 of body portion 152. Clamp arm 88 is connected to carrier-support adapter 16 by a pivot member 92 positioned approximately midway along length of clamp arm 88 as shown, for example, in FIG. 2. Pivot member 92 extends laterally across the width of clamp arm 88 and through side panels 94, 96 of support adapter 16 as shown in FIG. 7.

Each clamp arm 88 is configured to couple selectively infant seat 12 to carrier-support adapter 16. As shown in FIG. 4, clamp arm 88 includes an upper end 98 and a lower end 100. Upper end 98 includes a hook 102, a first cam surface 104, and a second cam surface 106. Hook 102 faces toward foot end 22 of infant carrier 12 and is sized to encircle partially its companion mounting post 46 when infant carrier 12 is seated fully in stroller 14 as shown in FIG. 5. Hook 102 and pivot pin 92 are positioned relative to companion mounting post-receiving slot 90 so that hook 102 will trap mounting post 46 securely when infant carrier 12 is seated fully in stroller 14 and each mounting post 46 is seated fully in its companion slot 90. It will be understood that this clamping of mounting post 46 by hook 102 traps mounting post 46 and positively restrains mounting post 46 from both general horizontal and general vertical movement relative to hook 102. Hook 102 also restrains infant carrier 12 from both general horizontal and general vertical movement relative to carrier-support adapters 16.

First cam surface 104 is arranged relative to pivot member 92 and mounting post 46 so that clamp arm 88 will pivot in a counter clockwise direction, as shown by arrow 21 in FIG. 4, when first cam surface 104 is subjected to a contacting force. Such contacting forces occur when mounting post 46 contacts first cam surface 104 as infant carrier 12 is seated onto carrier-support adapters 16 as shown in FIG. 4. First cam surface 104 is positioned to lie at upper end 98 adjacent to hook 102. Second cam surface 106 is disposed adjacent to first cam surface 104 and is arranged relative to pivot member 92 so that clamp arm 88 will pivot in a counter clockwise direction, as shown by arrow 21 in FIG. 6, when second cam surface 106 is subjected to a contacting force (generated, for example, by a manually operated release button 108).

Each clamping assembly 80 further includes a spring 110 that biases clamp arm 88 in a clockwise direction as shown by arrow 23 in FIG. 5 to a closed position 111 with hook 102 resting against a side wall 114 of mounting post-receiving slot 90 as shown in FIG. 2. Spring 110 is attached to lower end 100 of clamp arm 88 and to a spring-support post 112 that is integrally appended to side panels 94, 96 of carrier-support adapter 16. While clock-wise and counter-clockwise directions are described herein, clamp arm 88 may be positioned to lie in various configurations and may pivot in any number of directions without exceeding the scope of the present invention. In addition, while clamping assembly 80 is illustrated and described, a variety of latching mechanisms may be used in accordance with the present invention to couple selectively infant carrier 12 onto carrier-support adapters 16. While stroller 14 is illustrated and described, the stroller may include a wide variety of frames, wheels, and seats in accordance with the present invention.

Base 18 is positioned to lie spaced-apart from stroller 14 and is configured to receive selectively infant seat 12 therein to mount infant seat 12 in a vehicle (not shown). Base 18 is described in detail in U.S. Pat. No. 5,567,008 entitled "Portable Infant Seat Having A Detachable Base", to Cone, II, the specification of which is incorporated herein by reference. As shown in FIG. 1, base 18 includes two spaced-apart upright walls 144, 146 that each include a clamping apparatus 148 therein. See FIG. 9. Moreover, each wall 144, 146 includes a slot 154 sized to receive mounting post 46 therein. Clamping apparatus 148 is formed in a similar manner to clamping mechanism 80 and like reference numbers are used in the figures to denote like components. Clamping apparatus 148 selectively couples infant carrier 12 to base 18.

Base 18 is coupled selectively to the vehicle seat by a seat belt (not shown). The seat belt is passed through apertures formed in side walls of base 18. As shown in FIG. 8, shell 32 of infant carrier 12 is offset by a specified distance to provide clearance for the seat belt (not shown). While base 18 is illustrated and described, a wide variety of vehicle seat bases may be used in accordance with the present invention.

To install carrier-support adapters 16 onto stroller seat 66, the caregiver must simply place stroller support 82 onto side rail 68 so that second locking mechanism 136 is aligned with aperture 75 formed in side rail 68. The caregiver then presses carrier-support adapter 16 toward side rail 68 until foot portion 140 engages wall 71 and flexible tab portion 134 engages side wall 73 of side rail 68, as shown in FIG. 2. To remove carrier-support adapters 16, the caregiver must pull foot portion 140 from wall 71 and tab portion 134 from side wall 73. At this time, carrier-support adapter 16 is released from side rail 68. Since the support adapters 16 are oriented front to back stroller by the location of the locking mechanism 136 and aperture 75 and since the infant seat is oriented front to back on the support adapters 16 by location of the release button 108 and clamp 88, head portion 20 of the infant seat 12 must be located at the front of the stroller to face handle 64.

The caregiver can attach canopy 160 above stroller seat when carrier-support adapters 16 are removed from side rails 68. The caregiver simply extends each mounting post 170 through respective aperture 75 in side rail 68. When carrier-support adaptors 16 are coupled to side rails 68, the caregiver must simply extend mounting posts 170 through holes 172 formed through platform 83 of adaptors 16.

To lock infant carrier 12 to carrier-support adapter 16, a person holding infant carrier 12 positions infant carrier 12 over stroller seat 66 and over carrier-support adapters 16. Carrier 12 is lowered toward stroller 14 so that mounting posts 46 contact underlying clamping assemblies 80 provided in spaced-apart carrier-support adapters 16. As infant carrier 12 is lowered toward an installed position 126 lying spaced-apart from stroller seat 66 in cavity 17, clamping assemblies 80 are moved to a mounting post-receiving open position 128, as shown in FIG. 6, allowing mounting posts 46 to enter mounting post-receiving slots 90 formed in upright carrier-support adapters 16. When infant carrier 12 is in installed position 126 on carrier-support adapters 16, as shown in FIGS. 1 and 5, clamping assemblies 80 function to trap mounting posts 46 in slots 90 thus locking infant carrier 12 to stroller 14. Though mounting posts 46 also provide structural support to hubs 40, it can now be understood that pivotable carrying handle 64 operates independently of clamping assemblies 80 and may be moved to any position relative to infant carrier 12 during locking and unlocking of infant carrier 12 to and from stroller 14.

As infant carrier 12 is lowered into carrier-support adapters 16, mounting posts 46 contact first cam surfaces 104 on leading edges of clamp arms 88. As illustrated in FIG. 4, the camming engagement of mounting post 46 to first cam surface 104 forces clamp arm 88 to pivot against tension spring 110. As infant carrier 12 is lowered between carrier-support adapters 16, the camming engagement of mounting post 46 and clamp arm 88 causes clamp arm 88 to pivot to open position 128. Continued lowering of infant carrier 12 places infant carrier 12 in installed position 126 within carrier-support adapter 16 as shown in FIG. 5. Once infant carrier 12 is in installed position 126 and mounting post 46 has advanced past hook 102, clamp arm 88 springs back to closed position 111 trapping mounting post 46 in slot 90 and locking infant carrier 12 to stroller 14.

To remove infant carrier 12 from stroller 14, the caregiver grasps both opposing carrier side walls 24, 26 and depresses both release buttons 108 as shown in FIG. 6. Camming engagement of bottom ends 124 of release buttons 108 and second cam surfaces 106 of clamp arms 88 pivots clamp arms 88 against tension springs 110 to open position 128. Once clamp arms 88 are in open positions 128, the caregiver simply lifts infant carrier 12 from carrier-support adapters 16 as shown by phantom arrow 26. Apparatus 10 provides the caregiver with the ability to simply lower infant carrier 12 onto carrier-support adapters 16 to lock infant carrier 12 to stroller 14 and to depress release buttons 108 and lift infant carrier 12 from carrier-support adapters 16 to unlock infant carrier 12 from stroller 14. This convenience makes it easy for caregivers to convert quickly stroller 14 from infant to toddler use, by simply removing infant carrier 12 from stroller 14. In addition, this one apparatus 10 can be used to carry infants in strollers, automobiles, and carry infants while away from automobiles.

Figure 9:
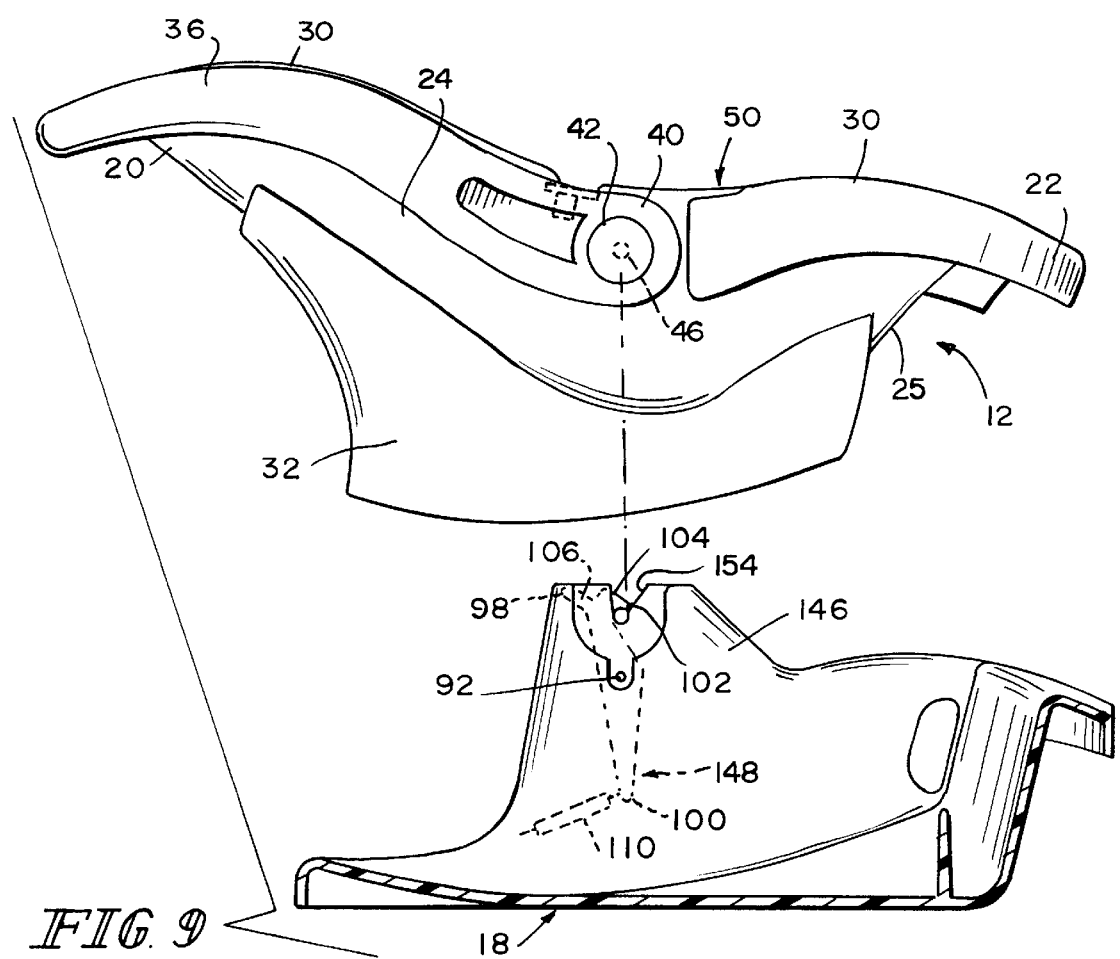
FIG. 9 is an exploded view of the infant carrier and the base of FIG. 8 following removal of the infant carrier from the base with the infant carrier shown in full elevation and the detachable base shown in a transverse sectional view and showing (in phantom) one of the clamp arms and clamp arm-biasing springs in the detachable base and one of the mounting posts and release buttons in the infant carrier and showing the contoured infant carrier-receiving floor in the base.

As shown in FIGS. 8 and 9, infant seat 12 is installed on base 18 by lowering infant carrier 12 onto base 18. Mounting posts 46 contact first cam surfaces 104 on clamp arms 88. As infant carrier 12 is lowered between side walls 144, 146, the camming engagement of mounting post 46 and clamp arm 88 causes clamp arm 88 to pivot to open position 128. Continued lowering of infant carrier 12 places infant carrier 12 in installed position 126 within base 18 as shown in FIG. 8.

To remove infant carrier 12 from base 18, the caregiver grasps both opposing carrier side walls 24, 26 and depresses both release buttons 108. Camming engagement of bottom ends 124 of release buttons 108 and second cam surfaces 106 of clamp arms 88 pivots clamp arms 88 against tension springs 110 to open position 128. Once clamp arms 88 are in open positions 128, the caregiver simply lifts infant carrier 12 from carrier-support adapters 16.

As shown in FIG. 11, an apparatus 210 is provided in accordance with the present invention that enables a caregiver (not shown) to transport an infant (not shown) in an infant carrier 12 in a stroller 214. In addition, apparatus 210 enables the caregiver to remove infant carrier 12 from stroller 214 and immediately place the infant or another child into stroller 214. Thus, the caregiver may quickly and easily convert stroller 214 from infant to toddler use, by simply removing infant carrier 12 from stroller 214.

Apparatus 210 includes stroller 214 having a set of detachable carrier-support adapters 216 mounted on stroller 214 to receive selectively infant carrier 12. Carrier-support adapters 216 enable the caregiver to place the infant in a stroller seat 266 of stroller 214 without removing carrier-support adapters 216.

Stroller 214 is shown in FIG. 11 and is formed to receive carrier-support adapters 216. Stroller 214 includes a frame 251. Frame 251 includes a front frame member 252 and a rear frame member 254 coupled to first frame member 252 to form a seat-receiving cavity 256 therebetween. Front frame member 252 also includes a handle 264. As shown in FIG. 11, a saddle 267 is coupled to front frame member 252. Connectors 219 extend through saddle 267 and frame member 252 to couple saddle 267 thereon. As shown in FIG. 12, a frame connector 253 extends through saddle 267 and rear frame member 254 to permit pivotable movement between front and rear frame members 252, 254.

As shown in FIG. 11, saddle 267 includes a top portion 269 resting upon front frame member 252 and side panels 271, 273 extending from top portion 269 to define a frame-receiving cavity 298 therebetween. Side panel 271 includes an aperture 296 (see FIG. 13) therethrough. In addition, saddle 267 is formed to couple carrier-support adapter 216 thereon. As shown in FIG. 13, saddle 267 includes a flexible tab portion 302 portioned to lie within the frame-receiving cavity 298. Tab portion 302 includes a generally U-shaped base 306 spring-biased between side panels 271, 273 and a pin 304 extending through aperture 296. Pin 304 may be any number of latching devices and may be positioned in any number of locations on side panels 271, 273. In addition, it is within the scope of the present invention to place flexible tab portion 302 within front frame member 252.

Further, stroller 214 includes a stroller seat 266 that is positioned to lie in seat-receiving cavity 256 and is coupled to frame 251. Stroller seat 266 includes a seat portion 272, a back portion 270, and side panels 268 extending between seat and back portions 272, 270. Side panels 268 are coupled to frame 251. Wheels 274 are coupled to front and rear frame members 252, 254 and a basket 276 is positioned to lie in seat-receiving cavity 256 between wheels 274 and stroller seat 266.

Carrier-support adapter 216 are coupled to frame 251 and configured to cooperate with stroller seat 266 to define a cavity 217 sized to receive infant carrier 12 therein. Illustratively, carrier-support adapters 216 enable the caregiver to attach infant carrier 12 onto stroller 214 without having to remove the infant from infant carrier 12; to remove infant carrier 12 from stroller 214 without having to remove the infant from infant carrier 12; and to place the infant or another child in stroller seat 266 of stroller 214 without first removing carrier-support adapters 216. Later, carrier-support adapters 216 can be removed from frame 251 when infant seat 12 is no longer needed.

Carrier-support adapters 216 are mounted selectively upon saddle 267 and are arranged to support infant carrier 12, as shown in FIG. 11. Each carrier-support adapter 216 includes a stroller mount 282. Stroller mount 282 is coupled to saddle 267 and includes a platform 283. Referring now to FIG. 13, platform 283 includes a bottom side 279 facing frame member 252, an opposite top side 281, and arms 285, 287 extending from top side 281. Arms 285, 287 and platform 283 cooperate to define a cavity 300 therebetween. In addition, arm 285 is formed to include an aperture 310 that is in general alignment with aperture 296 when carrier-support adapter 216 is mounted upon saddle 267.

Carrier-support adapters 216 are also formed to include a carrier mount 250 extending from stroller mount 282 to couple selectively infant carrier 12 thereto. Carrier mount 250 includes a body portion 252 that cooperates with stroller seat 266 to define cavity 17. Body portion 252 also houses clamping assembly 80 therein. Clamping assembly 80 is generally the same as assembly 80 previously described and like reference numerals will be used to denote like components. Each body portion 252 of carrier-support adapter 216 that houses clamping assembly 80 includes a top end 256, an opposite bottom end 258 adjacent to stroller mount 282, and side panels 320, 322. Side panels 320, 322 extend between top and bottom ends 256, 258 and define a hollow interior cavity 324 as shown in FIG. 13. Elongated clamp arm 88 is mounted inside hollow interior cavity 324 of body portion 252. While stroller 214 is illustrated and described, it is understood that the stroller may include a wide variety of frames, wheels, and seats in accordance with the present invention.

To install carrier-support adapters 216 onto frame 251, saddle 267 is inserted into cavity 300 of carrier-support adapters 216. Carrier-support adapter 216 is adjusted so that aperture 310 formed in arm 285 is aligned with pin 304. At this time, base 306 biases pin 304 through aperture 310 to couple carrier-support adapter 216 to saddle 267. To remove carrier-support adapters 216 from frame 251, the caregiver must simply press, as shown by arrow 330 in FIG. 13 pin 304 through aperture 310. At this time, carrier-support adapter 216 is released from saddle 267.

To lock infant carrier 12 to carrier-support adapter 216, a person holding infant carrier 12 positions infant carrier 12 over stroller seat 266 and over carrier-support adapters 216. Carrier 12 is lowered toward stroller 214 so that mounting posts 46 contact underlying clamping assemblies 80 provided in spaced-apart carrier-support adapters 216. As infant carrier 12 is lowered toward an installed position 126 lying spaced-apart from stroller seat 266 in cavity 217, clamping assemblies 80 are moved to a mounting post-receiving open position 128, as previously described, allowing mounting posts 46 to enter mounting post-receiving slots 90 formed in upright carrier-support adapters 216.

As infant carrier 12 is lowered into carrier-support adapters 216, mounting posts 46 contact first cam surfaces 104 on leading edges of clamp arms 88. As illustrated in FIG. 4, the cramming engagement of mounting post 46 to first cam surface 104 forces clamp arm 88 to pivot against tension spring 110. As infant carrier 12 is lowered between carrier-support adapters 216, the camming engagement of mounting post 46 and clamp arm 88 causes clamp arm 88 to pivot to open position 128. Continued lowering of infant carrier 12 places infant carrier 12 in installed position 126 within carrier-support adapter 216. Once infant carrier 12 is in installed position 126 and mounting post 46 has advanced past hook 102, clamp arm 88 springs back to closed position 111 trapping mounting post 46 in slot 90 and locking infant carrier 12 to stroller 214.

To remove infant carrier 12 from stroller 214, the caregiver grasps both opposing carrier side walls 24, 26 and depresses both release buttons 108 as shown in FIG. 12. Camming engagement of bottom ends 124 of release buttons 108 and second cam surfaces 106 of clamp arms 88 pivots clamp arms 88 against tension springs 110 to open position 128. Once clamp arms 88 are in open positions 128, the caregiver simply lifts infant carrier 12 from carrier-support adapters 216. Apparatus 210 provides the caregiver with the ability to lower infant carrier 12 onto carrier-support adapters 216 to lock infant carrier 12 to stroller 214 and to depress release buttons 108 and lift infant carrier 12 from carrier-support adapters 216 to unlock infant carrier 12 from stroller 214. This convenience makes it easy for caregivers to convert stroller 214 from infant to toddler use quickly, by simply removing infant carrier 12 from stroller 214. In addition, this one apparatus 210 can be used to carry infants in strollers, automobiles, and carry infants while away from automobiles.

Although the invention has been described in detail with reference to a preferred embodiment, variations and modifications exist within the scope and spirit of the invention as described and defined in the following claims.

What is claimed is:

1. An apparatus comprising
   an infant stroller having wheels attached to side rails and including a stroller seat attached to said side rails and a basket attached to said side rails and spaced apart from the stroller seat,
   an infant carrier having mounting posts extending laterally outward thereof,
   carrier-support adapters, each carrier-support adapter including a base selectively coupled to one of the side rails, a locking means for releasably coupling each adapter to one of the side rails to prevent rotation of the adapter relative to the side rail, and a carrier mount extending upwardly from the base, said carrier mount having a mounting post support area being selectively coupled to the laterally extending mounting posts of the infant carrier, wherein each base defines a channel therein, the channel sized to receive the side rail therein for supporting the carrier-support adapter on the stroller side rails and
   wherein coupling of the carrier mount to the infant carrier posts is obtained by at least one pivoting clamp arm mounted to the carrier mount to pivot in a fore and aft direction of the stroller about an axis extending transversely of the stroller to a position grasping and holding the infant carrier mounting post to the mounting post support area.

2. The apparatus of claim 1, wherein the base of each carrier-support adapter includes a platform and arms extending from the platform and the arms straddle the side rail when the base is coupled to the stroller.

3. The apparatus of claim 2, wherein one of the arms includes a tab portion that selectively engages the side rail.

4. The apparatus of claim 3, wherein the base includes a locking tab extending from the platform into the channel for selective engagement with the side rail.

5. The apparatus of claim 4, wherein the side rail includes an aperture therethrough and the locking tab extends through the aperture and engages the side rail when the base is coupled to the stroller.

6. The apparatus of claim 5, wherein the base includes opposite ends, the arms are positioned to lie adjacent to one of the ends, and the locking tab is spaced-apart from the arms.

7. The apparatus of claim 6, wherein the side rail includes a top surface and side walls depending from the top surface and the tab portion of the arm selectively engages one of the side walls and the locking tab selectively engages the opposite side wall.

8. The apparatus of claim 1, wherein there are at least two carrier-support adapters, each coupled to a separate side rail of the stroller,
   wherein a locking mechanism is provided to lock the base of one of the carrier-support adapters to the infant stroller, and wherein each carrier-support adapter includes a stroller mount.

9. The apparatus of claim 8, wherein there is a U-shaped saddle resting on each side rail and the locking mechanism is coupled to the saddle.

10. The apparatus of claim 9, wherein the base of one of the carrier-support adapters includes an aperture therein and the locking mechanism is sized for extension through the aperture to lock the carrier-support adapter to the saddle.

11. The apparatus of claim 10, wherein the locking mechanism includes a pin sized for extension through the aperture and a spring urging the pin to extend through the aperture.

12. The apparatus of claim 8, wherein the locking mechanism includes a a U-shaped saddle that rests on the side rail.

13. The apparatus of claim 12, wherein the saddle includes opposing panels defining a cavity therebetween and a locking mechanism configured to couple selectively the stroller mount.

14. The apparatus of claim 13, wherein the stroller mount includes an aperture therein and the locking mechanism of the saddle is sized for extension through the aperture to lock the carrier-support adapter to the saddle.

15. The apparatus of claim 14, wherein the locking mechanism includes a pin sized for extension through the aperture and a spring-loaded base.

16. The apparatus of claim 13, wherein the locking mechanism includes a pin spring-biased into engagement with the stroller mount.

17. The apparatus of claim 8, wherein the side rails include a front frame member and a rear frame member pivotably coupled to the front frame member and the stroller mounts are configured to be coupled to the front frame member.

18. The apparatus of claim 8, the stroller mount of each carrier-support adapter includes a platform and opposing arms extending from the platform and the arms extend about the side rails when the stroller mount is coupled to the stroller.

19. The apparatus of claim 8, wherein the stroller mount of each carrier-support adapter is coupled selectively to the stroller seat.

20. The apparatus of claim 1, wherein the pivoting clamp arm is spring biased to a coupled position with the mounting post.

21. The apparatus of claim 20, wherein the pivoting clamp arm has a curved hook end which end encircles a portion of the mounting post to couple the infant carrier to the carrier mount.

22. The apparatus of claim 1, wherein the pivoting clamp arm has a curved hook end which end encircles a portion of the mounting post to couple the infant carrier to the carrier mount.

23. The apparatus of claim 1 wherein there is a U-shaped saddle resting on each side rail and the locking mechanism is coupled to the saddle.

24. An infant support apparatus comprising:
   an infant carrier for supporting an infant thereon and having mounting posts extending laterally therefrom,
   an infant carrier base for supporting the infant carrier and including spaced apart upright walls and a clamping apparatus positioned on one of the upright walls to selectively grasp around one of the mounting posts and lock the infant carrier to the infant carrier base when the infant carrier is to be mounted to the infant carrier base,
   an infant stroller for supporting the infant carrier, and
   carrier-support adapters, each carrier-support adapter including a carrier mount for selectively coupling the carrier-support adapter to the infant stroller and provided with a clamping apparatus to selectively grasp around one of the mounting posts and lock the infant carrier to the carrier mount when the carrier mount is to be coupled to the stroller.

25. The apparatus of claim 24, wherein the carrier mount includes at least one pivoting clamp arm having a hook sized to engage one of the mounting post when infant carrier is coupled to the infant stroller.

26. The apparatus of claim 25, wherein the clamp arm includes first cam surface positioned to lie adjacent to the hook and configured to pivot the clamp arm in a first direction when the mounting post contacts the first cam surface.

27. The apparatus of claim 26, wherein the clamp arm includes a second cam surface positioned to lie adjacent to the first cam surface and configured to pivot the clamp arm in a second direction when the second cam surface is subjected to a contacting force.

28. The apparatus of claim 24, wherein the infant carrier includes a release button positioned to contact the clamping apparatus of the infant carrier base when the infant carrier is coupled thereto.

29. The apparatus of claim 25, wherein the clamp arm includes first cam surface positioned to lie adjacent to the hook and configured to pivot the clamp arm in a first direction when the mounting post contacts the first cam surface.

30. The apparatus of claim 29, wherein the clamp arm includes a first cam surface positioned to lie adjacent to the hook and configured to pivot the clamp arm in a first direction when the mounting post contacts the first cam surface.

31. The apparatus of claim 30, wherein the clamp arm includes a second cam surface positioned to lie adjacent to the first cam surface and configured to pivot the clamp arm in a second direction when the second cam surface is subjected to a contacting force.

32. The apparatus of claim 31, wherein the infant carrier includes release buttons and each release button includes a bottom end positioned to contact the second cam surface of the clamp arm when the infant carrier is in the fully-seated position in the stroller.

33. The apparatus of claim 24, wherein the clamping apparatus of the infant carrier base includes at least one clamp arm having a hook sized to grasp one of the mounting posts when the infant carrier is mounted on the infant carrier base.

34. The apparatus of claim 33, wherein the clamp arm includes a first cam surface positioned to lie adjacent to the hook and configured to pivot the clamp arm in a first direction when the mounting post contacts the first cam surface.

35. The apparatus of claim 34, wherein the clamp arm includes a second cam surface positioned to lie adjacent to the first cam surface and configured to pivot the clamp arm in a second direction when the second cam surface is subjected to a contacting force .

36. The apparatus of claim 35, wherein the infant carrier includes release buttons and each release button includes a bottom end positioned to contact the second cam surface of the clamp arm when the infant carrier is in the fully-seated position in the stroller.

37. The apparatus of claim 33, wherein a user in attaching an infant carrier to the carrier mount press the laterally extending mounting posts against an end of pivoting clamp arm to initially cam the clamp arm out of its coupled position against the spring and permits the spring to return the clamp arm to its coupled position after the mounting post passes below the end of the clamp arm.

38. The apparatus of claim 37, wherein the pivoting clamp arm has a curved hook end which end encircles a portion of the mounting post to couple the infant carrier to the carrier mount.

39. An apparatus comprising
   an infant stroller having wheels attached to side rails and including a stroller seat attached to said side rails and a basket attached to said side rails and spaced apart from the stroller seat,
   an infant carrier having mounting posts extending laterally outward thereof,
   carrier-support adapters, each carrier-support adapter including a base selectively coupled to one of the side rails and a carrier mount extending upwardly from the base, said carrier mount having a mounting post support area being selectively coupled to the laterally extending mounting posts of the infant carrier, wherein each base defines a U-shaped saddle, the saddle being sized to receive the side rail therein for supporting the carrier-support adapter on the stroller side rails, and wherein coupling of the carrier mount to the infant carrier posts is obtained by at least one pivoting clamp arm mounted to the carrier mount to pivot in a fore and aft direction of the stroller about an axis extending transversely of the stroller to a position grasping and holding the infant carrier mounting post to the mounting post support area.

40. An apparatus comprising an infant stroller having wheels attached to side rails and including a stroller seat attached to said side rails and a basket attached to said side rails and spaced apart from the stroller seat, an infant carrier having mounting posts extending laterally outward thereof, carrier-support adapters, each carrier-support adapter including a base selectively coupled to one of the side rails, a lock mechanism positioned to engage one of the side rails to prevent rotation of the adapter relative to the side rail, and a carrier mount extending upwardly from the base, said carrier mount having a mounting post support area being selectively coupled to the laterally extending mounting posts of the infant carrier, wherein each base defining a channel therein, the channel sized to receive the side rail therein for supporting the carrier-support adapter on the stroller side rails and wherein coupling of the carrier mount to the infant carrier posts is obtained by at least one pivoting clamp arm mounted to the carrier mount to pivot in a fore and aft direction of the stroller about an axis extending transversely of the stroller to a position grasping and holding the infant carrier mounting post to the mounting post support area.

* * * * *